United States Patent [19]

Smischny

[11] Patent Number: 5,166,890
[45] Date of Patent: Nov. 24, 1992

[54] PERFORMANCE MONITORING SYSTEM

[75] Inventor: Randall A. Smischny, Topeka, Kans.

[73] Assignee: Southwestern Telephone Company, St. Louis, Mo.

[21] Appl. No.: 443,850

[22] Filed: Dec. 4, 1989

Related U.S. Application Data

[63] Continuation of Ser. No. 133,348, Dec. 15, 1987, abandoned.

[51] Int. Cl.$^5$ .................. G06F 11/30; G06F 15/20
[52] U.S. Cl. ................... 364/551.01; 371/5.1
[58] Field of Search ............ 364/551.01, 551.02; 371/5, 22; 377/28; 340/825.06, 825.16

[56] References Cited

U.S. PATENT DOCUMENTS

| | | | |
|---|---|---|---|
| 4,234,954 | 11/1980 | Lange et al. | 371/5 |
| 4,291,403 | 9/1981 | Waddill et al. | 371/5 |
| 4,363,123 | 12/1982 | Grover | 371/5 |
| 4,677,619 | 6/1987 | Kawai | 371/5 |
| 4,710,924 | 12/1987 | Chum | 371/5 |
| 4,713,810 | 12/1987 | Chum | 371/5 |
| 4,742,518 | 5/1988 | Shedd | 371/22 |
| 4,796,257 | 1/1989 | Minoo | 371/5 |
| 4,829,519 | 5/1989 | Scotten et al. | 371/5 |

Primary Examiner—Kevin J. Teska
Attorney, Agent, or Firm—Sandler, Greenblum & Bernstein

[57] ABSTRACT

A performance monitoring system is provided for in-service monitoring of digital carrier facilities of the type having a chain of facilities serially linked together. Each facility has at least one component which processes a digital signal received from an upstream facility, and which has bit error detection circuitry for producing a logic level output in response to detection of an error in the digital signal. A logic circuit is associated with each component in a facility and is responsive to the logic level output of the bit error detection circuitry with which the logic circuit is associated for storing a representation of the number of errors detected thereby. A control center is provided for in-service monitoring of the performance of the components in the facilities. A connection circuit is provided for selectively connecting the logic means to the control center.

35 Claims, 4 Drawing Sheets

PERFORMANCE MONITORING SYSTEM

This application is a continuation of application Ser. No. 133,348, filed Dec. 15, 1987, now abandoned.

TECHNICAL FIELD

This invention relates to a performance monitoring for in-service monitoring of digital carrier facilities associated with a digital data communication system.

BACKGROUND ART

Data communication between separate locations usually utilizes a common carrier such as a telephone company that provides a chain of facilities serially linked by telephone lines, radio, or fiber optic lines between the two locations. A typical situation is shown in FIG. 1 wherein a sending customer using a modem sends digital data to a receiving customer along a telephone cable to a central telephone office where the digital data are combined, typically, with twenty-three other inputs in a channel bank which performs a time division multiplexing operation on the input data. Conventionally, the channel bank accepts data from each of twenty-four customers in eight bit blocks. These are assembled into a frame (192 bits) with a single frame bit which contains the parity bit for the frame. Each frame of 193 bits (a DS-1 frame) is sampled 8000 times per second producing a digital signal of 1.54 MBPS.

To permit communication with low signal-to-noise ratios, DS-1 signals transmitted between a central office and a toll office are transmitted as a bipolar bit stream in which the polarity of succeeding pulses is reversed so that the ONE's of the stream alternate as positive or negative levels about the ZERO level. By reason of this arrangement, a DS-1 signal received at the toll office may be monitored by a bipolar violation monitor that produces a logic level output in response to each detection of a bipolar violation in the signal. That is to say, each time successive pulses in the digital signal are of the same polarity, the monitor produces a logic level signal because it is assumed that this detected situation arises due to external events such as noise operating on the signal. The output of the bipolar violation monitor is applied to an alarm control unit at the toll office and serves to close relay contacts that cause illumination of a lamp indicating the existence of this type of problem.

At the toll office, the DS-1 signal containing the data from the sending customer is combined with twenty-seven other similar signals in a digital MUX which performs a time division multiplexing to produce a DS-3 signal. The digital MUX includes a parity generator that analyzes the data processed by the MUX and produces a parity bit for each DS-3 frame thereby creating a 45 MBPS data stream. Two DS-3 signal channels and an overhead channel carrying interfacility communications and control information not available to the public are inputted to what is termed a second generation digital radio modulator operating at 6.6 GHz. Thus, this carrier is modulated with the three input signals and is beamed to a repeater facility typically 10-20 miles away.

At the repeater facility, the radio signal is demodulated to recover the two DS-3 signals and the signals on the overhead channel, the parity bits being stripped from the DS-3 signal and analyzed by a parity checker circuit. Conventionally, the parity checker circuit produces a logic level signal in response to detection of a parity error. The logic level signal drives an alarm control unit which includes a number of relays that are closed in response to certain conditions. Contact closure results when a parity error occurs and this is evidenced by illumination of the lamp on the alarm control unit. The unit has counters that provide information on the bit-error-ratio (BER) or the number of errors per second, and indicates a major alarm when the BER exceeds a $10^{-3}$ threshold, or a minor alarm when the BER exceeds a $10^{-6}$ threshold. Contact closure also occurs upon loss of a signal. In all cases, the parity checker produces a logic level signal which is analyzed by the alarm control unit.

After parity checking occurs, the parity bits are stripped from the signals which are processed to rebuild them; and new parity bits are substituted. The reconstituted signals in the three channels are then used to modulate another 6.6 GHz carrier, and the resultant RF signal is broadcast to a downstream repeater facility.

Eventually, the RF signal is demodulated at a remote toll office and the recovered DS-3 signals demultiplexed at a remote central office where they are broken down into their constituent DS-1 signals, one of which contains the sending customer's data. The DS-1 signal is again demultiplexed and the digital signal from the sending customer is sent to the receiving customer via a telephone cable.

The above description represents a typical way in which digital data are transmitted between customers using technology developed and in place for voice communications. As is well know, the human ear and brain cooperate to render intelligible voice information transmitted using this equipment even though a considerable amount of error is introduced into the digital data during transmission. This is the case because of the large degree of redundancy in the information signal for voice communication.

To provide a measure of the performance of this type of equipment when it is used for voice communication, a bit-error-rate surveillance strategy evolved. This strategy is based on manually analyzing the rate of occurrence of parity bit errors in DS-3 signals using an "eye" monitor that displays a qualitative indication of the level of errors in the signal by the flatness of an elliptical pattern on an oscilloscope screen, the pattern being derived by synchronizing the sweep of the oscilloscope with the frame rate of the DS-3 signal, and displaying the amplitude of the signal. This approach was adequate for facility maintenance purposes when voice communication was the dominant portion of digital traffic. Under this condition, the alarm provisions of digital transmission systems focused on "outage" problems that occurred when the BER exceeded $10^{-3}$ or $10^{-6}$ thresholds.

With the advent of digital services, the strategy that worked well for voice communication became unacceptable because digital equipment is more sensitive to transmission errors. Bit-error-rates generally accepted as being satisfactory for voice communication purposes are not necessarily acceptable so far as digital data transmissions are concerned. As a result, errors in the transmission of digital data to be used by digital equipment are usually neither detected nor corrected until after customer complaints are received. As a consequence, the telephone industry has shifted to an error-free-seconds alarm surveillance strategy for digital services In this strategy, the idea is to provide performance guarantees to customers in terms of percent error-free-seconds. For example, a customer may be guaranteed by the carrier that he will receive 99.5% error-free-seconds. Stated otherwise, the carrier is guaranteeing that the transmission system will introduce only one error in 200 seconds of transmission. This type of guarantee works well with fiber optic cable systems, but it is difficult to establish and to monitor in existing span terminal facilities that were designed for voice communications. The problem is that a large number of errored-seconds (ES) may occur in a digital transmission system without causing any alarms because the BER is still lower than the established thresholds.

The conventional method for testing facilities for errored-seconds performance when the facilities span terminals have no built in errored-seconds detection circuitry, is to take the facility out of service and perform an out-of-service testing procedure. The disadvantage of this approach is often that the facility is still working well enough in most cases to provide high grade service to many customers on the facility. Nevertheless, when the facility is taken out of service, customers must be transferred to other facilities prior to the tests, and must be transferred back after testing is complete. These are labor intensive processes that are undesirable in an automated system carrying heavy traffic.

It is therefore an object of the present invention to provide a performance monitoring system that effectively retrofits existing telephone industry equipment to an error-free-seconds alarm surveillance strategy.

BRIEF DESCRIPTION OF THE INVENTION

According to the present invention, a performance monitoring system is provided for the in-service monitoring of digital carrier facilities of the type having a chain of facilities serially linked together, each facility having at least one component which processes a digital signal from an upstream facility and which has bit-error detection circuitry for producing a logic level output in response to detection of error in said digital signal, and an alarm control unit including relay contacts closeable in response to detection of a predetermined rate of errors by said detection circuitry. According to the present invention, the system comprises logic means associated with each component in a relay station and responsive to the logic output of the bit-error detection circuitry with which the logic means is associated for storing a representation of the number of errors detected thereby, a control center for monitoring the performance of components in the facilities, and connection means for selectively connecting the logic means to the control center.

In the preferred embodiment, the logic means associated with each component comprises a counter and means for incrementing the counter when the bit error circuitry with which the logic means is associated detects an error in the digital signal processed by the component. When the counter is reset once per second, the contents of the counter are usable to compute the error-free-seconds of operation of the component. In the preferred form of the invention, the logic means associated with each component includes a decoder responsive to the contents of the counter for producing a representation of an errored-second as soon as the contents of the counter is different from zero. The logic means associated with each component may also include a second flip-flop operatively associated with the decoder, the second flip-flop being set by the decoder when the contents of the counter reaches a predetermined number indicating an alarm condition which may be a minor alarm condition or a major alarm condition. In addition, or alternatively, the logic means associated with each component may include a further flip-flop which is set by the decoder when the contents of the counter reaches a predetermined number signifying a control center notification condition. The setting of the last mentioned flip-flop may be used to effect a connection of the logic means to the control center.

In the preferred embodiment of the invention, the logic means includes a computer having a memory, and means for storing representations of the states of the flip-flops in the memory in response to operation of the means by which the counter and flip-flops are reset. In this manner, the number of errors occurring in a predetermined period, for example 15 minutes, can be stored in the computer at the facility for historical purposes.

The invention further includes a means at the control center for selectively accessing the memories in the logic means in the various facilities and effecting a transfer of the contents of the memories to the control center. In this manner, the control center may interrogate and have access to each component at each facility so that the history of errors in each facility can be inspected over a period of time in order to evaluate the performance of the components in a facility in terms of their introduction of errors into the chain. With this arrangement, maintenance can be scheduled in accordance with a predetermined pattern of errors before these errors reach a point where a given component in a facility must be taken out of service for maintenance purposes.

BRIEF DESCRIPTION OF THE DRAWINGS

An embodiment of the present invention as disclosed in the accompanying drawings wherein.

DETAILED DESCRIPTION

Figure 1:
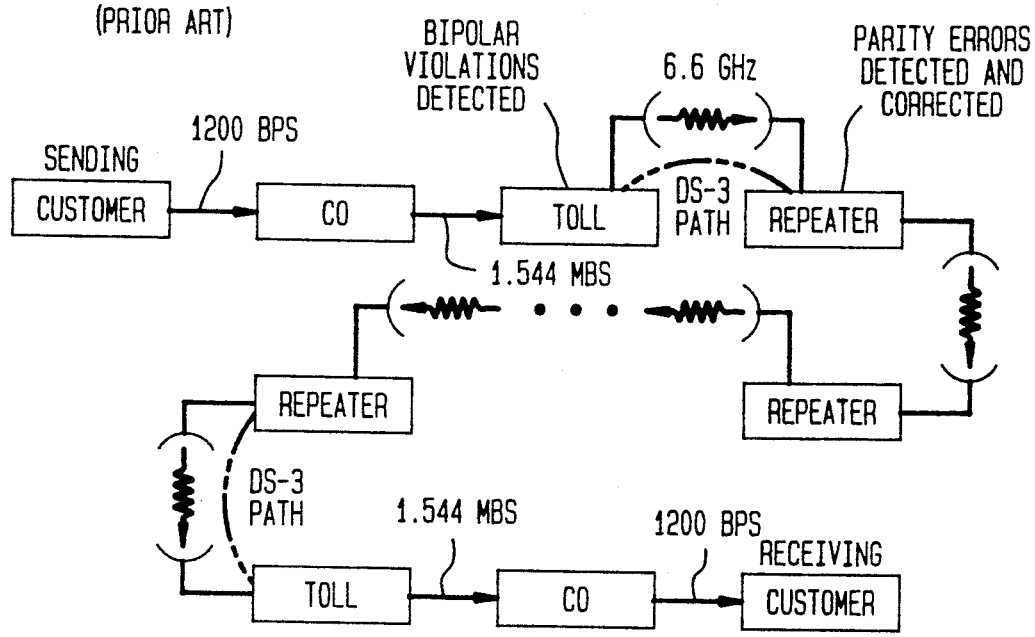
FIG. 1 is a block diagram of a conventional digital carrier facility designed originally for voice communication but which is used by digital customers.

Referring now to the drawings, FIG. 1 is a block diagram representing a situation in which a sending customer is transmitting digital data to a receiving customer via a telephone system designed for voice communications but adapted to the transmission of digital data. In this situation, the receiving customer eventually becomes the sending customer, and the sending customer becomes the receiving customer. That is to say, the system shown in FIG. 1 is bi-directional, but data flow in only one direction is shown for simplicity.

FIG. 1 shows a customer sending digital data via a 1200 baud modem through a telephone line to a central office facility where a channel bank multiplexes many channels into one wide-bandwidth channel. Conventionally, the standard system (T1 carrier) is made up of 24 individual channels. The channel bank generates and multiplexes the digital signals producing a 1.544 MBPS digital signal called a DS-1 signal. This signal might be transmitted on a T1 transmission line which has repeaters in the line for continued signal regeneration. The signal is eventually received at a toll facility of the telephone company where it is multiplexed with other DS-1 signals to produce a still higher level multiplexed signal.

The toll facility has a digital MUX which multiplexes 28 DS-1 signals into a DS-3 signal of 45 MBPS. Two of the DS-3 signals together with a signal constituting an overhead channel are used to modulate a digital radio which transmits the signal to a repeater facility where the radio signal is demodulated, regenerated, and then retransmitted to a repeater facility further away. A number of serially positioned repeater facilities are located between the originating toll facility and a receiving toll facility where the radio signal is demodulated into its constituent DS-3 signals. Further signal processing occurs for recovering the original DS-1 signal which is then demultiplexed to produce the original information transmitted by the sending customer. Finally, the remote central office facility transmits the information to the receiving customer via a telephone line.

Figure 2:
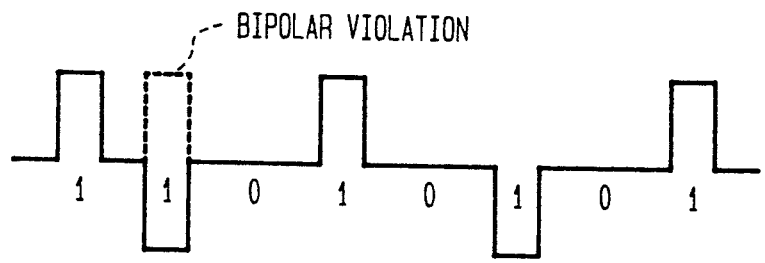
FIG. 2 is a curve that illustrates a bipolar violation for digital data.

Several levels of error detection are provided by the facilities by which the digital data are transmitted from the sending customer to the receiving customer. A rudimentary level of error detection arises because the digital data are transmitted as a bipolar bit stream as shown in FIG. 2. In the event that noise in the transmission path adversely affects the fidelity of the bit stream, the resultant stream would have what is termed a bipolar violation as indicated by the broken lines in FIG. 2. Because the equipment expects to have sequential pulses of opposite polarity, sequential pulses of the same polarity is indicative of a bipolar violation; and this condition is sensed and is used to produce a logic level output that is applied to an alarm control unit for indicating the situation.

Another level of error detection is provided by introducing a parity bit into the DS-1 and the DS-3 signals. For example, a demodulator at a repeater facility would include a parity recovery circuit for the purpose of determining whether any errors occurred during RF transmission. The parity recovery circuit produces a logic level output when a parity error occurs, and this output drives an alarm control unit which displays an indication that a parity error has occurred. Alarm control units referred to above are conventional in all span facilities originally designed for voice communications, and are provided at each of the facilities processing digital signals in the chain of facilities between the sending customer and the receiving customer.

Figure 3:
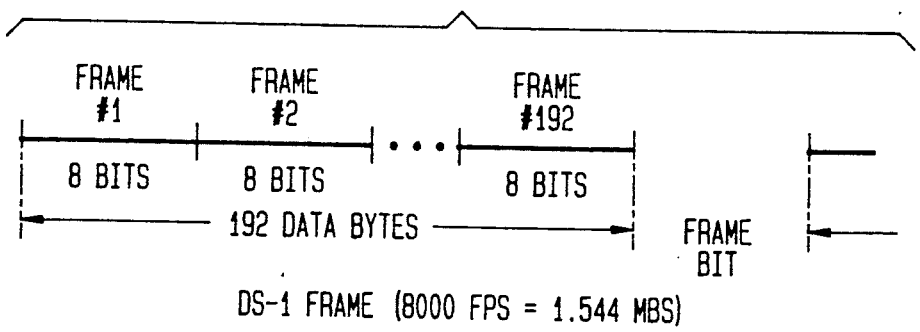
FIG. 3 represents a DS-1 frame which is part of a 1.544 MBPS data stream.
Figure 4:
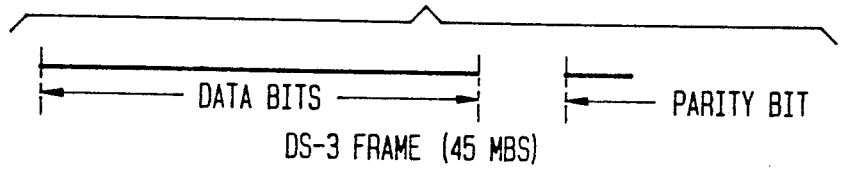
FIG. 4 is a single frame of a DS-3 signal showing the data bits and the parity bit therefor.

The operation described above is shown in greater detail in FIG. 5 to which reference is now made. Reference numeral 10 designates a digital carrier system designed for voice communications comprising a chain of facilities 11, 12, 13, 14 serially linked together for permitting sending customer 15 to send digital data via modem 16 to a receiving customer (not shown). Digital data from customer 15 are sent via modem 16 through cable pairs 17 to local central office 11 where the data in the cable pair are applied to one input channel of channel bank 18 together with 23 other inputs to produce what is termed a DS-1 signal of 1.544 MBPS. Channel bank 18 is conventional and operates by successively sampling the data in each of the 24 input channels at a rate of 8,000 times per second, and assembling the sampled data into DS-1 frames (see FIG. 3). The resultant 1.544 MBPS signal is sent, typically along a T-1 carrier, to local toll facility 12. Bipolar violation monitor 19 located at local toll office 12 processes the signal in line 20 by which the DS-1 signal is transmitted from the local central office to the toll facility. If monitor 19 detects a bipolar violation of the type described above, the monitor produces a logic level output which is applied to alarm control 21. For simplification, alarm control unit 21 is shown as having lamp 22 connected to a power supply (not shown) through normally open switch 23. A logic level output from monitor 19 serves to close switch 23 thereby causing lamp 22 to be illuminated for indicating the existence of a bipolar violation. Maintenance personnel at the local toll facility may inspect the alarm control associated with each line feed data into the toll facility to determine whether bipolar violations have occurred in transmissions from the local central office to the local toll office, and to identify potentially defective equipment.

As described previously, a total of twenty-eight DS-1 channels are applied to digital MUX 24 located in the toll office. The twenty-eight input channels of the digital MUX produce a single output DS-3 signal of 45 MBPS. Two such DS-3 channels plus an overhead channel, provided for the purpose of transmitting maintenance information or communications between facilities, are applied to what is termed a second generation digital radio modulator. The three input channels to modulator 25 modulate a 6.6 GHz carrier which is broadcast via antenna 26 to antenna 27 located at repeater facility 13. Typically, the first repeater facility may be from 10 to 20 miles distant from the toll facility.

At the repeater facility, the RF signal produced by antenna 27 is demodulated in demodulator 28 to recover the two DS-3 channels and the overhead channel. Demodulator 28 also includes parity recovery circuit 29 for the purpose of testing for parity errors in the received data. If a parity error is detected, the parity recovery circuit produces a logic level output that drives alarm control 30. The alarm control unit has a plurality of outputs including an indicator that shows loss of signal to demodulator 28 and which show both major and minor alarm conditions as well as an indicator lamp which indicates the existence of a parity error. In accordance with convention, the operation of the alarm control unit is based on a surveillance strategy that records bit-error rates. Thus, alarm control unit 30 may produce displays indicating a minor alarm condition, such as a bit-error rate that exceeds a $10^{-6}$ threshold, or a major alarm condition such as a bit-error rate that exceeds a $10^{-3}$ threshold. Loss of signal indication is also provided by this unit.

The demodulator circuit is effective to strip the parity bits from the incoming signal and recover the individual signals. The recovered signals are processed to restore signal strength and shape, and then applied to modulator 31 which includes a parity generator for reconstituting the parity bits in the data applied to the modulator.

Figure 5:
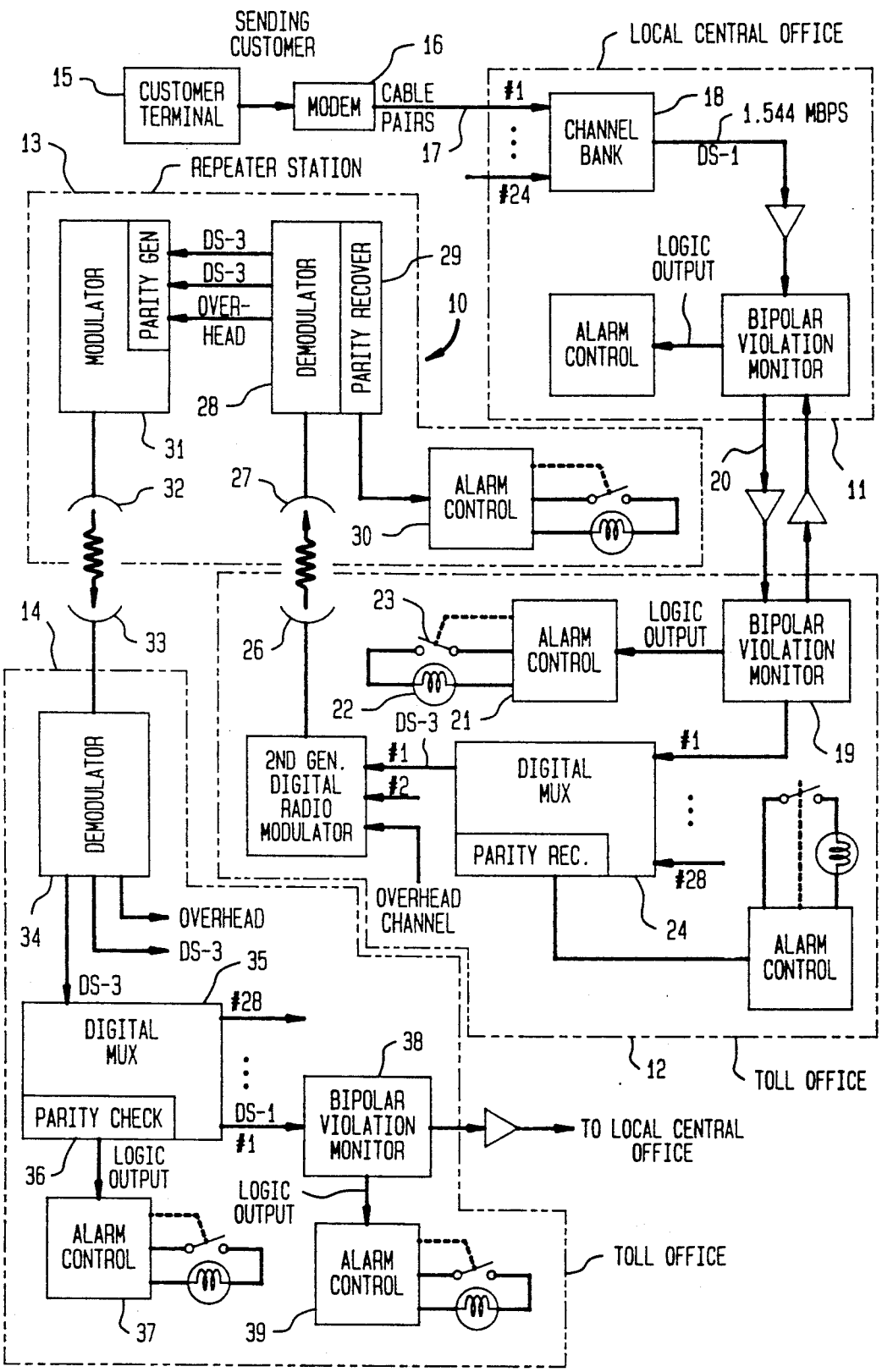
FIG. 5 is a block diagram of the arrangement shown in FIG. 1 but detailing the multiplexing and modulation apparatus used in digital carrier facilities for the purpose of showing the availability of logic level outputs in a facility.

The result is a signal that modulates a 6.6 GHz transmitter which broadcasts the modulated RF signal via antenna 32 at the repeater facility to receiving antenna at another repeater facility, or to a remote toll facility. For simplicity purposes, only one repeater facility is shown in FIG. 5, it being understood that many such repeater facilities would be provided in a normal installation to permit long-distance communications.

Eventually, the radio signal is received at receiving antenna 33 of remote toll facility 14 where the process described above in connection with repeater facility 13 is carried out using demodulator 34. The original DS-3 signal produced at toll office 12 is recreated and applied to digital MUX 35 which demultiplexes the DS-3 signal to produce 28 channels of DS-1 signals.

Digital MUX 35 includes a parity check circuit 36 which produces a logic level output when a parity error is detected. The logic level output is applied to alarm control unit 37 which operates in the manner described above. The DS-1 signal is applied to a bipolar violation monitor 38 which, as described above, produces a logic level output in response to detection of a bipolar violation. The logic level output of monitor 38 is applied to alarm control unit 39 which contains indicia for indicating the existence of bipolar violations.

The above-described arrangement is conventional and represents equipment in current use for transmitting digital data but designed for voice communications. As indicated above, maintenance of this equipment is based on monitoring bit-error rates. While this approach has proved to be adequate for transmission of voice-based data, it is not as useful when the data being transmitted has a digital basis. A strategy based on errored-seconds is needed; and the present invention provides a method of and apparatus for applying errored-seconds strategy to equipment designed for bit-error ratios.

Figure 6:
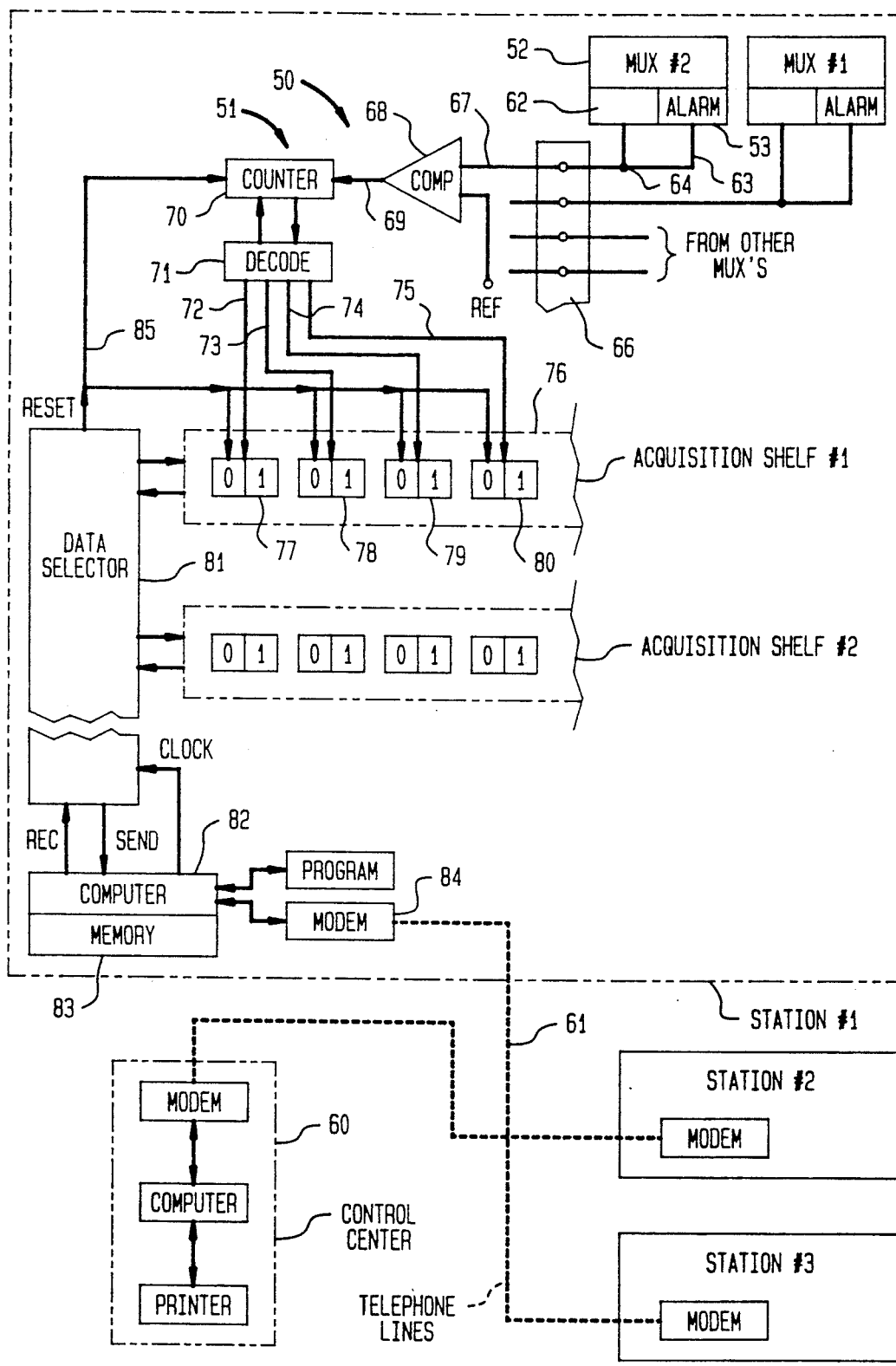
FIG. 6 is a block diagram of the present invention applied to a number of facilities in a chain thereof, and showing the control center linked by telephone to the various facilities.

According to the present invention, performance monitoring (PM) circuit 50, shown in FIG. 6, provides for the in-service monitoring of digital carrier facilities such as the various toll offices and repeater facilities that are serially linked together for the purpose of transmitting digital data from one location to another. Each of these facilities has at least one component which processes a digital signal from an upstream facility and which has bit-error detection circuitry for producing a logic level output in response to detection of an error in the digital signal. PM circuit 50 derives its input from the logic level outputs produced by pre-existing conventional bit-error ratio equipment. Such equipment includes an alarm control unit including relay contacts closeable in response to detection of a predetermined rate of errors detected by the bit-error detection equipment.

Referring again to FIG. 6, reference numeral 51 designates logic means associated with each component in a facility which processes a digital signal from an upstream facility. Logic means 51 is responsive to a logic level output of bit error detection circuitry with which logic means 51 is associated for storing a representation of the number of errors detected thereby. Before describing the manner in which the representation of the number of detected errors is stored, reference is made in FIG. 6 to control center 60 which provides for in-service monitoring of the performance of the components of the various facilities. Connection means 61 provide for selectively connecting the logic means in each facility to the control center.

Reference numeral 52 represents the back plane of a DS-3 MUX which includes parity check circuit 62 interconnected by cable 63 to alarm control unit 53. This cable is tapped at 64 and connected to terminal 65 mounted on terminal board 66. Cable 67 applies the output of parity check circuit 62 to one input of comparator 68 which has an output appearing in lead 69 when parity check circuit 62 produces a logic level output that is also applied to alarm unit 53.

The output of comparator 68 drives asynchronous counter 70 which is thus incremented each time parity check circuit 62 produces a logic level output. Decoder 71 has a plurality of outputs for detecting the contents of counter 70. In the embodiment shown in FIG. 6, decoder 71 has four outputs 72–75 for producing an output at four different values of the contents of counter 70. An output may appear on line 72, for example, when the contents of the counter changes from 0 to 1 upon the receipt of the first error detected by parity checker circuit 62. While counter 71 may be programmed for various decoded possibilities, a typical arrangement when used with component 52 which is a DS-3 component, is for decoder 71 to produce an output on line 73 when the contents of counter 70 is 10. Typically, decoder 71 may be designed to produce an output at line 74 when the contents of counter 70 is 100. Finally, decoder 71 may be designed to produce an output at line 75 when the contents of counter 70 reaches a number typically 1000. These numbers are not critical but may be selected in accordance with the estimation of maintenance personnel.

The output of decoder 71 is applied to acquisition shelf 76 containing a plurality of set-reset flip flops 77–80. As a consequence, when the contents of counter 70 is unity, flip flop 77 is set. When the contents of counter 70 is a 10, flip flop 78 is set, etc. The outputs of all of these flip flops are applied to data selector 81 which is controlled by the output of computer 82. Associated with the computer is memory 83; and modem 84 is provided for connection to telephone line 61.

Figure 7:
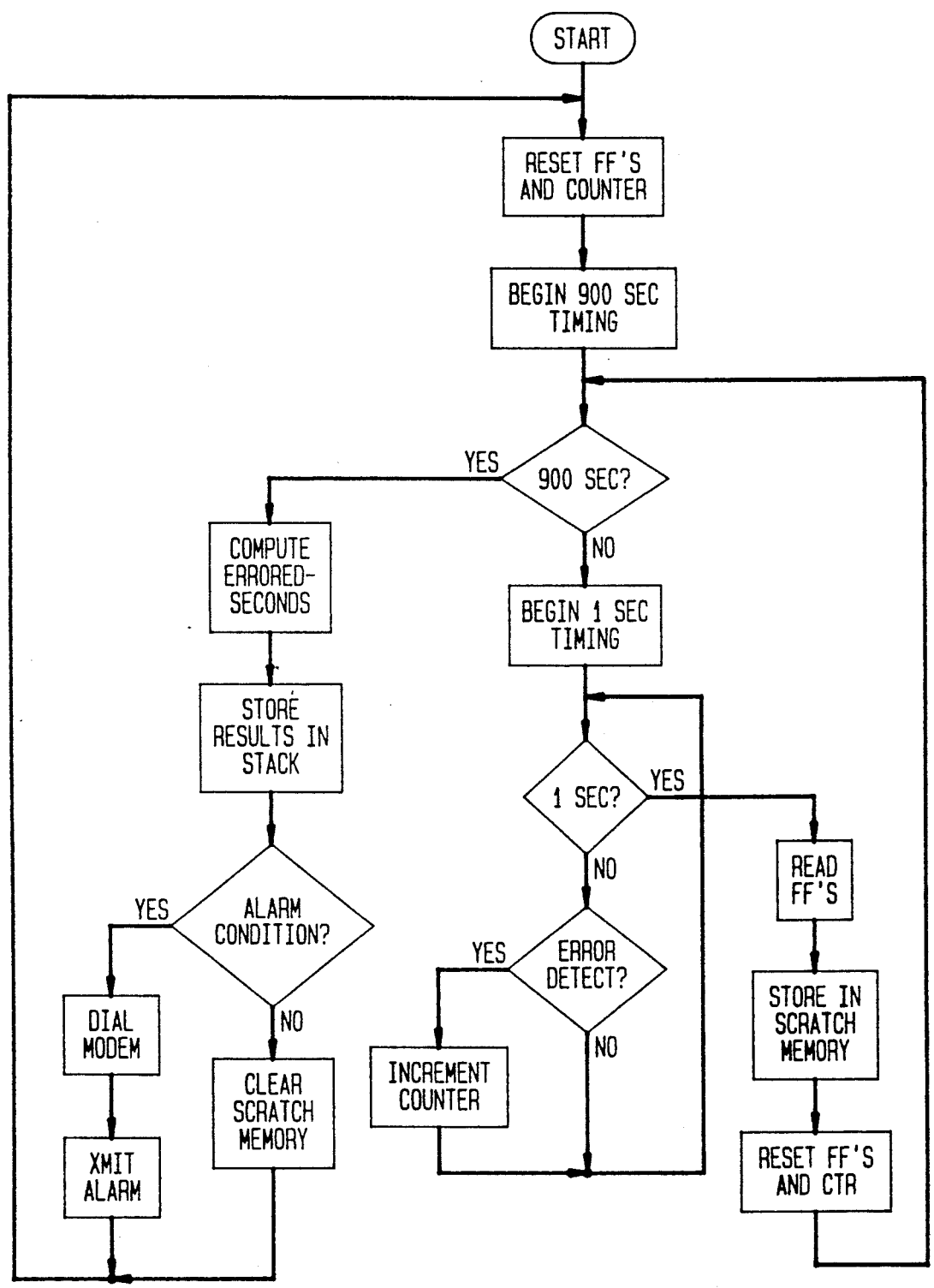
FIG. 7 is a flow chart illustrating the operation of the system as shown in FIG. 6.

The program that runs in computer 82 carries out the procedure outlined in FIG. 7. The first step is the resetting of flip flops 77–80 and the resetting of counter 70 which occurs as a consequence of a reset signal appearing in line 85 of data selector 81. The computer then begins timing a preselected interval, typically 900 seconds (15 minutes). After checking to determine whether the 900 second interval has terminated, the program begins a one second timing interval. At the end of each one second interval, the acquisition shelf 76 is polled. If an error is detected by parity check circuit 62 thereby incrementing counter 70, counter 70 is incremented and flip flop 77 is thereby set. If during this same one second interval, parity check circuit 62 detects additional errors, counter 70 is incremented for each error and flip flops 78–80 are set in accordance with the contents of counter 70.

At the end of the one second interval, all of the flip flops on acquisition shelf 76 are read into data selector 81 and transferred by a bus to computer 82 where the information is stored in a scratch memory contained in the RAM of the computer. At this point, the flip flops and the counter are reset by a reset command appearing in line 85 and the cycle described above repeats again by first determining whether 900 seconds has elapsed. If the period has not lapsed, another one second timing interval is begun. Again, the flip flops on acquisition shelf 76 are set in accordance with the contents of counter 70 during this one second interval. At the end of this one second interval, the data in the scratch memory of the computer is incremented by the status of the flip flops in acquisition shelf 76. In other words, four separate memory locations are provided in the scratch memory, each one being incremented by the respective flip flops on the acquisition shelf. For example, the first location in the scratch memory would always be incremented by flip flop 77; the second location in the scratch memory would be incremented by flip flop 78, etc. Thus, at the end of 900 seconds, the contents of the scratch memory will contain integer values representative of errored seconds. For example, the first location in the scratch memory, i.e., the location incremented by the state of flip flop 77, will contain the number of errored seconds during a 15 minute interval. Location 2, on the other hand, which is incremented by the state of flip flop 78 will contain the number of times in fifteen minutes that 10 errors have occurred, etc.

At the end of the 900 second interval, the program stores the contents of the scratch memory to corresponding stacks in main memory 83 of the computer. With four flip-flops, the main memory would contain four stacks, the contents of the scratch memory associated with flip-flop 77 (the number of errored-seconds in fifteen minutes) would be loaded into the top of the stack to replace the last element in the stack that would be lost. The stacks preferably have 1024 elements. The contents of the scratch memory associated with the other flip-flops would be transferred to main memory in a similar manner. As described below, these stacks are made available to the control center on demand via a modem.

The contents of the stacks are analyzed by the computer to determine whether an alarm condition exists, and the nature of the alarm condition. If the alarm condition is one for which control center notification is required, then the program activates the modem and transmits a preselected error message to the control center identifying the source facility and the component that produced the alarm. If no alarm condition exists, then the program clears the scratch memory, resets the flip flops and the counter and the procedure described above repeats.

On a basis determined by the manager of the control center, any or all of the computers at the various facilities linked to the control center can be interrogated to effect a transfer of data stored in the memories to a memory at the control center for processing. The data thus transferred provides historical information that will indicate trends in error detection and permit preventive maintenance to be carried out as needed with minimal downtime for the various facilities and minimal interference to customer service.

The advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A performance monitoring system (PMS) for in-service monitoring of digital carrier facilities of the type having a chain of facilities serially linked together, each facility having at least one component which processes a digital signal from an upstream facility and which has bit-error detection circuitry for producing a logic level output in response to detection of an error in said digital signal, and an alarm control unit including relay contacts closeable in response to detection of a predetermined rate of errors detected by said circuitry, said system comprising:

a) logic means associated with each component in a facility and responsive to logic level outputs of the bit-error detection circuitry with which the logic means is associated for storing a representation of the number of errored-seconds detected thereby;

b) a control center for in-service monitoring of the performance of the components in the facilities; and c) connection means for selectively connecting said logic means to said control center.

2. A performance monitoring system according to claim 1, wherein the bit error detection of circuitry of a component produces a logic level output in response to parity errors in the digital signal processed by the component.

3. A performance monitoring system according to claim 1, wherein the bit error detection of circuitry of a component produces a logic level output in response to bipolar violations in the digital signal processed by the component.

4. A performance monitoring system according to claim 1, wherein the bit error detection circuitry of a component produces a logic level output in response to alarm contact closure.

5. A performance monitoring system according to claim 1, wherein the logic means associated with each component comprises:

a) a counter; and b) means for incrementing said counter when the bit error detection circuitry with which the logic means is associated detects an error in the digital signal processed by the component.

6. A performance monitoring system according to claim 5, wherein the logic means associated with each component includes reset means periodically operable to reset said counter.

7. A performance monitoring system according to claim 6, wherein said reset means resets said counter once per second.

8. A performance monitoring system according to claim 7, wherein the logic means associated with each component includes a decoder responsive to the contents of said counter for producing a representation of an errored-second as soon as the contents of said counter is different from zero.

9. A performance monitoring system according to claim 7, wherein the logic means associated with each component includes a decoder, and a first flip-flop operatively associated with said decoder, said first flip-flop being set by said decoder when the counter contents changes from zero to one.

10. A performance monitoring system according to claim 9, wherein said first flip-flop is reset by said reset means when said counter is reset.

11. A performance monitoring system according to claim 10, wherein the logic means associated with each component includes a second flip-flop operatively associated with said decoder, said second flip-flop being set by said decoder when the contents of said counter reaches a predetermined number signifying an alarm condition more severe than indicated by the setting of said first flip-flop.

12. A performance monitoring system according to claim 11, wherein said second flip-flop is reset by said reset means when said counter is reset.

13. A performance monitoring system according to claim 12, wherein the logic means associated with each component includes a third flip-flop operatively associated with said decoder, said third flip-flop being set by said decoder when the contents of said counter reaches a predetermined number signifying an alarm condition more severe than indicated by the setting of said second flip-flop.

14. A performance monitoring system according to claim 13, wherein said third flip-flop is reset by said reset means when said counter is reset.

15. A performance monitoring system according to claim 14, wherein the logic means associated with each component includes a fourth flip-flop operatively associated with said decoder, said fourth flip-flop being set by said decoder when the contents of the counter reaches a predetermined number signifying an alarm condition more severe than that indicated by the setting of said third flip-flop.

16. A performance monitoring system according to claim 15, wherein said fourth flip-flop is reset by said reset means when said counter is reset.

17. A performance monitoring system according to claim 16, wherein said logic means include means responsive to the setting of the fourth flip-flop for sending an alarm signal to said control center.

18. A performance monitoring system according to claim 16, wherein said logic means includes a computer having a memory, and means for storing representations of the status of the flip-flops in said memory in response to operation of said reset means.

19. A performance monitoring system according to claim 18, wherein said control center includes means for selectively accessing the memories in the logic means and effecting a transfer of the contents of the memories to the control center.

20. A method for monitoring the performance of a digital carrier facility of the type having a component for processing digital signal received from another facility, said component having bit error detection circuitry for producing a logic level output in response to detection of an error in said digital signal, said method comprising the steps of:
 a) beginning timing of a predetermined time interval;
 b) incrementing a counter each time said bit error detection circuitry produces a logic level output during said predetermined time interval;
 c) transferring the contents of said counter to a scratch memory, and clearing said counter at the end of said predetermined time interval; and
 d) repeating steps a)-c).

21. A method according to claim 20 wherein said predetermined time period is one second.

22. A performance monitoring system having a control center for in-service monitoring of a remote digital carrier facility that processes digital signals, said system comprising:
 a) means for detecting bit errors in the processing by said facility of said digital signals;
 b) logic means responsive to detection of said bit errors for storing an indication of the number of errored-seconds in the operation of the facility; and
 c) means at said control center for interrogating the stored indication of the number of errored-seconds in the operation of said facility.

23. A performance monitoring system according to claim 22, wherein said logic means includes:
 a) a resetable asynchronous counter; and
 b) means for incrementing said counter in response to detection of a bit error.

24. A performance monitoring system according to claim 23, wherein said logic means includes reset means for periodically resetting said counter.

25. A performance monitoring system according to claim 24, wherein the period for resetting said counter is one second whereby the contents of said counter, prior to reset, is the number of errors per second.

26. A performance monitoring system according to claim 24 including means for computing the number of errors per second in the interval between resetting of said counter.

27. Apparatus for computing the number of errored-seconds during in-service operations of a digital carrier facility that processes digital signals, said apparatus comprising:
 a) means for detecting bit errors in said digital signals;
 b) logic means responsive to detection of said bit errors for recording the number of errored-seconds in a predetermined interval of time.

28. Apparatus for computing errored-seconds during in-service operation of a digital carrier facility that processes digital signals, said apparatus comprising:
 a) means for detecting bit errors in said digital signals; and
 b) logic means responsive to detection of said bit errors for producing an indication of the number of errored-seconds in a predetermined interval of time;
 c) wherein said logic means is constructed and arranged to compute and store the number of errored-seconds in said predetermined interval of time.

29. Apparatus according to claim 28 wherein, said logic means includes:
 (a) a resetable asynchronous counter; and
 (b) means for incrementing said counter in response to detection of a bit error.

30. Apparatus according to claim 29 wherein said logic means includes reset means periodically resetting said counter whereby the number of bit errors per second can be computed.

31. Apparatus according to claim 30 wherein said logic means is constructed and arranged such that the period for resetting said counter is one second whereby the contents of said counter, prior to reset, is the number of bit errors per second.

32. Apparatus according to claim 30 wherein said logic means includes a decoder, and at least one flip-flop associated with the decoder for storing an indication of an errored-second.

33. Apparatus according to claim 32 wherein said decoder has a first terminal at which an output appears when the counter is incremented from zero, said at least one flip-flop being responsive to the output of said one terminal for changing state and indicating the occurrence of an errored-second.

34. Apparatus according to claim 33 wherein the decoder has a second terminal at which an output appears when the counter is incremented a predetermined number of times, and a second flip-flop is responsive to the output at said second terminal for changing state and indicating that a predetermined number of errors have occurred in a second.

35. Apparatus according to claim 33, including a storage register, and means for incrementing said register each time said counter is reset if said at least one flip-flop has changed state.

* * * * *

UNITED STATES PATENT AND TRADEMARK OFFICE
CERTIFICATE OF CORRECTION

PATENT NO. : 5,166,890
DATED     : November 24, 1992
INVENTOR(S) : R. SMISCHNY

It is certified that error appears in the above-identified patent and that said Letters Patent is hereby corrected as shown below:

On the cover, at "[73] Assignee", after "Southwestern", please add ---Bell---.

Signed and Sealed this

Twenty-third Day of April, 1996

Attest:

BRUCE LEHMAN

Attesting Officer

Commissioner of Patents and Trademarks